Feb. 14, 1933.   J. F. O'CONNOR   1,897,584
FRICTION SHOCK ABSORBING MECHANISM
Filed May 31, 1928   2 Sheets-Sheet 1
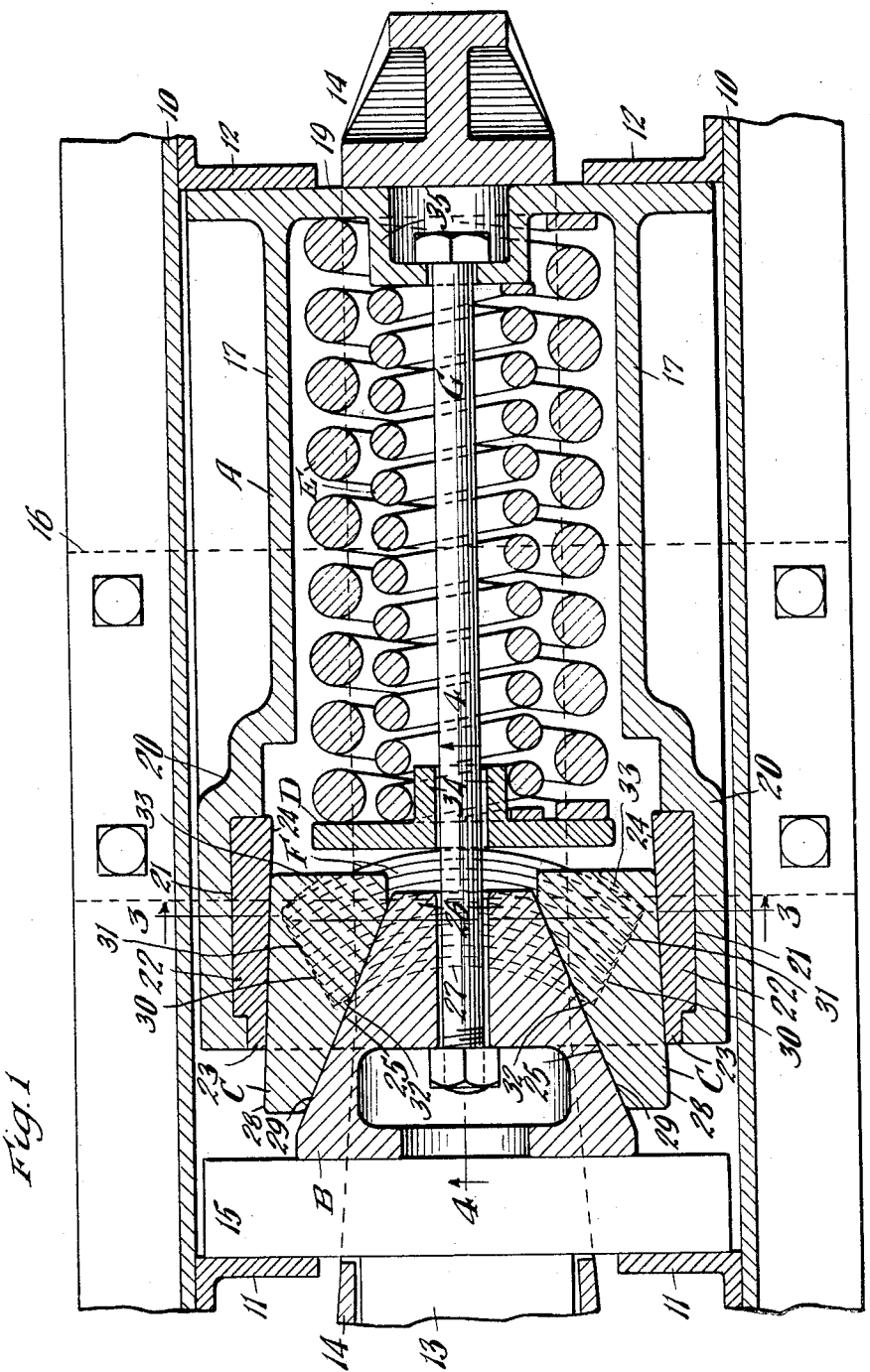
Witness
Wm. Geiger
Inventor
John F. O'Connor
By Joseph Harris
His Atty.

Feb. 14, 1933. J. F. O'CONNOR 1,897,584
FRICTION SHOCK ABSORBING MECHANISM
Filed May 31, 1928 2 Sheets-Sheet 2
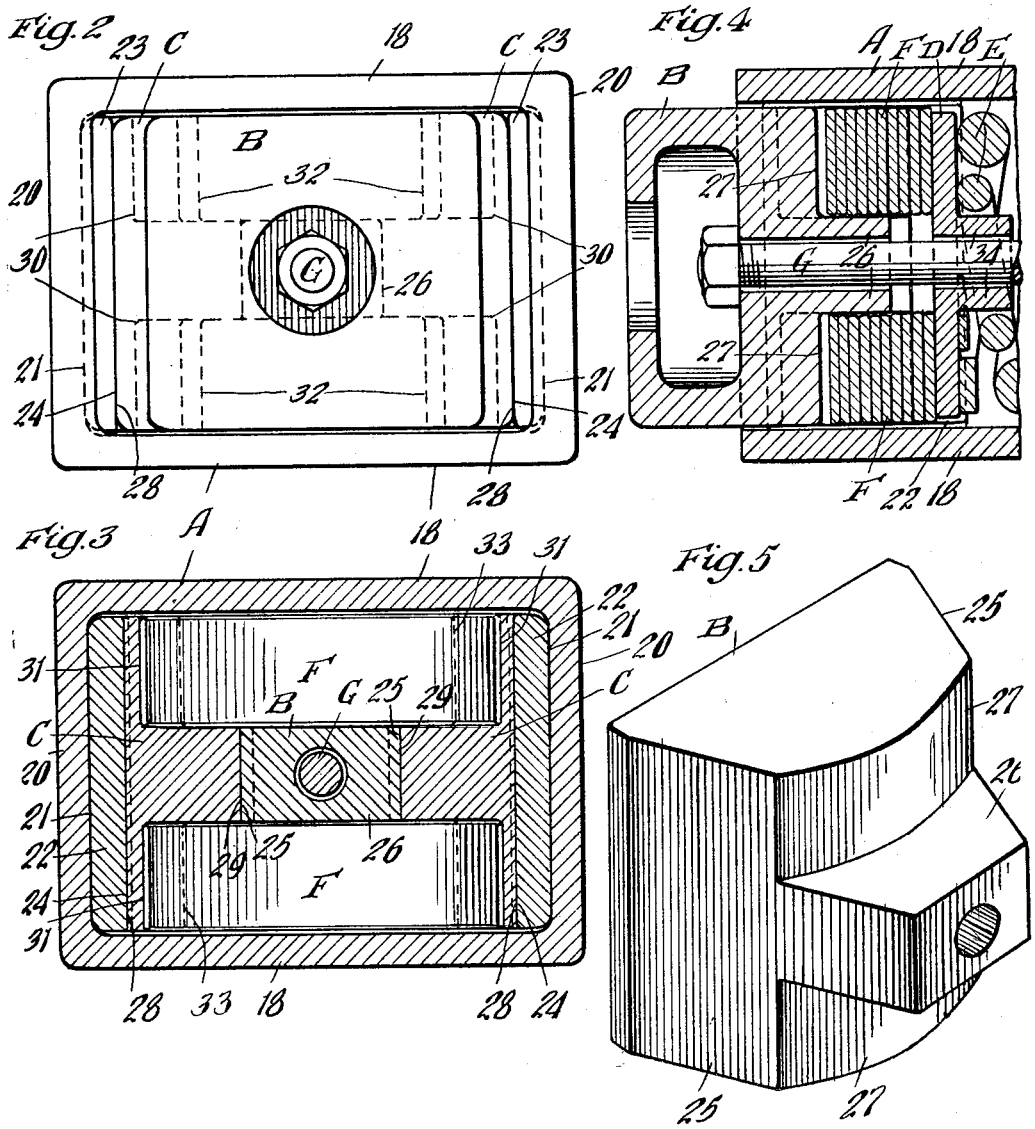
Inventor
John F. O'Connor
By Joseph Harris
His Atty.
Witness
Wm. Geiger Patented Feb. 14, 1933

1,897,584

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed May 31, 1928. Serial No. 281,768.

This invention relates to improvements in friction shock absorbing mechanisms.

One object of the invention is to provide a friction shock absorbing mechanism, especially adapted for railway draft riggings, including a casing provided with inwardly converging, opposed, interior surfaces at one end thereof, friction shoes cooperating with the casing surfaces, the shoes being forced inwardly of the casing during a compression stroke of the mechanism and having their movement resisted by a main spring disposed within the casing, lateral approach of the shoes, due to the differential action of the inwardly converging cooperating casing and shoe surfaces, being yieldingly opposed by a group of transversely disposed, nested, curved spring plates interposed between the shoes and having their opposite ends anchored to the shoes, wherein the arrangement of spring plates serves to at all times maintain frictional contact between the friction shoes and the shell surfaces.

A further object of the invention is to provide a friction shock absorbing mechanism, having high capacity due to relatively great differential action, including a casing provided with opposed, inwardly converging, interior friction surfaces at one end thereof, shoes cooperating with said surfaces, the shoes being forced inwardly of the casing during compression of the mechanism, a main spring resistance within the casing and a set of transversely disposed, curved spring plates opposing inward movement and relative lateral approach of the shoes, said set of spring plates having their opposed ends disposed in pockets in said shoes, said set of plates having the convex side thereof bearing on a spring follower member cooperating with the main spring resistance, said plates being flexed upon relative approach of the shoes, thereby increasing the curvature of the same to effect additional compression of the main spring resistance to provide shock absorbing capacity.

A still further object of the invention is to provide a friction shock absorbing mechanism, having differential action to provide high capacity, wherein all of the friction elements are at all times held in intimate frictional contact and wear of the parts adequately compensated for, including a friction shell having inwardly converging, opposed, interior friction surfaces, friction shoes cooperating with the shell friction surfaces, a pressure-transmitting element having wedging engagement with the shoes, a main spring resistance adapted to be compressed upon inward movement of the shoes, and a set of nested, transversely disposed, curved spring plates interposed between the shoes and adapted to be flexed upon relative approach of the shoes due to the differential action during compression of the mechanism, thereby increasing the curvature of the spring plates and effecting additional compression of the main spring resistance.

Other and further objects of the invention will more clearly appear from the description and claims hereinafter following.

In the drawings, forming a part of this specification, Figure 1 is a horizontal, longitudinal, sectional view of a portion of the underframe structure of a railway car, illustrating my improvements in connection therewith. Figure 2 is a front end elevational view of the shock absorbing mechanism proper illustrated in Figure 1. Figure 3 is a vertical, transverse, sectional view, corresponding substantially to the line 3—3 of Figure 1. Figure 4 is a longitudinal, vertical, sectional view of the forward end portion of the shock absorbing mechanism proper, corresponding substantially to the line 4—4 of Figure 1. And Figure 5 is a detailed perspective view of the wedge pressure transmitting member employed in connection with my improved shock absorbing mechanism.

In said drawings, 10—10 indicate the usual channel-shaped center or draft sills of a railway car underframe, to the inner sides of which are secured front stop lugs 11—11 and rear stop lugs 12—12. The inner end portion of the coupler shank or drawbar is designated by 13, to which is operatively connected a hooded yoke 14 of well known form. My improved shock absorbing mechanism proper, as well as a main front follower 15, are disposed within the yoke and the yoke, in turn, is supported in operative position by a detachable saddle plate 16 secured to the bottom flanges of the draft sills 10.

My improved shock absorbing mechanism proper comprises, broadly, a casing A; a wedge block B; a pair of friction shoes C—C; a spring follower D; spring resistance means including coil springs E and a laminated plate spring F; and a retainer bolt G.

The casing A is in the form of a substantially box-like casting of rectangular cross section, provided with longitudinally disposed, vertical side walls 17—17, horizontally disposed, spaced top and bottom walls 18—18, and a vertical, transverse rear end wall 19. The end wall 19, as shown, extends laterally outwardly beyond the side walls and cooperates with the rear stop lugs 12 in the manner of the usual rear follower. As clearly shown in Figure 1, the front end portions of the side walls 17 are laterally outwardly offset, as indicated at 20. The side wall portions 20 are thickened, as shown in Figure 1, and are cut away on the inner sides to provide seats or pockets 21 adapted to receive holding means on liners 22—22.

The liners 22, as shown, are provided with lateral enlargements on the outer sides thereof, which are seated in the pockets 21. At the forward ends, the liners 22 are reduced in thickness, as indicated at 23, to properly fit the side walls of the casing. On the inner side, each liner is provided with a longitudinally disposed, flat friction surface 24. The friction surfaces 24 of the opposed liners converge inwardly of the mechanism, as clearly indicated in Figure 1. As shown, the offset portions of the side walls 17 extend some distance rearwardly of the inner ends of the liners so as to accommodate the friction shoes C for inward movement to the required extent during a compression stroke of the mechanism.

The wedge pressure transmitting member B is in the form of a block having a flat front end face which bears directly on the inner side of the main follower 15. The wedge block B is provided with a pair of inwardly converging wedge faces 25—25 on the opposite sides thereof, which cooperate with the friction shoes C. As most clearly shown in Figure 5, the top and bottom portions of the wedge block, at the rear end thereof, are cut away, thereby providing a rearwardly extending central projection 26 and convex curved abutment walls 27—27 above and below said projection.

The friction shoes C are disposed at opposite sides of the wedge block and are of similar design. Each shoe C has a longitudinally disposed flat outer friction surface 28 which cooperates with the friction surface 24 of the liner at the corresponding side of the casing. On the inner side, each shoe is provided with a wedge face 29 which cooperates with the wedge face 25 at the corresponding side of the block B.

On the inner side, each shoe is provided with a pair of pockets 30—30, which are adapted to form seats for the corresponding ends of the groups of laminated spring plates F. As shown in Figure 1, the pockets have inclined side walls 31—31 and relatively short, slightly curved front end walls 32—32. As shown, the rear end walls, which are indicated by 33, are also inclined and are disposed angularly with respect to the side walls 31. Upon reference to Figure 1, it will be seen that the arrangement of the walls 33 is such as to provide clearance between the same and the next adjacent plate of the group of laminated spring plates, so as to permit the necessary amount of flexing of the plates.

The spring follower D is in the form of a heavy rectangular plate and is provided with a rearwardly extending central boss 34. The main spring resistance means, which includes the coil springs E and the laminated plate spring F, opposes inward movement of the friction shoes and, as shown in Figure 1, the coil spring E comprises inner and outer units, the inner unit having its opposite ends bearing on an inwardly extending boss 35 on the end wall 19 of the casing and the inner side of the spring follower D. The boss 34 of the spring follower extends within this coil so as to keep the spring in alignment with the spring follower. The outer coil of the spring resistance E is heavier than the inner coil and is interposed directly between the spring follower D and the rear end wall 19 of the casing.

The laminated plate spring F comprises top and bottom groups of nested spring plates, each group comprising ten such plates, as clearly shown in Figures 1 and 4. It will be evident that the number of plates may be varied to a considerable extent without departing from the invention. The spring plates of each group are transversely curved, as shown, and adjacent plates are in interfitting relation. The plates have their opposite ends seated in the pockets 30 of the friction shoes C and are so arranged that the convex outer face of the rearmost plate of each group bears directly on the front side of the spring follower D. As shown in Figure 1, the end walls 33 of the top and bottom pockets of the friction shoes C diverge with respect to the rear plates of the two groups so that a certain amount of flexing of the spring plates is permitted without the same engaging the outer end portions of the walls 33 of the pockets.

The mechanism is held assembled and of overall uniform length by the retainer bolt G, which has its opposite ends anchored to the boss 35 of the rear end wall of the casing A and the wedge block B. The retainer bolt is so adjusted that the main spring resistance, including the spring elements E and F, are under initial compression.

It will be seen that in the normal full release position of the parts, which is illustrated in Figure 1, the spring follower D is spaced an appreciable distance rearwardly from the friction shoes. The actuating force imparted to the friction shoes C is thus transmitted through the two groups of spring plates F to the spring follower D and to the spring resistance E.

Due to the converging relation of the interior friction surfaces of the casing or friction shell A, a differential action will be had, thereby causing lateral approach of the friction shoes C during a compression stroke and flexing of the interposed groups of laminated spring plates. When the spring plates are flexed during relative lateral approach of the friction shoes, the curvature of the plates will be increased, thereby forcing the spring follower D rearwardly and effecting compression of the main spring resistance E.

The operation of my improved shock absorbing mechanism, assuming a compression stroke, is as follows: The front follower 15 and the casing A will be moved relatively toward each other, thereby carrying the wedge block B inwardly of the casing and forcing the friction shoes C rearwardly. Due to the cooperating wedge faces of the wedge block and friction shoes, the latter will be forced into tight frictional engagement with the friction surfaces of the casing or shell. During the inward movement of the wedge block B and friction shoes C, the friction shoes will be forced to approach each other laterally, due to the converging relation of the friction surfaces of the shell or casing, thereby producing a differential action, the shoes C slipping inwardly on the wedge faces of the block B. As will be evident during the compression stroke, the force will be transmitted to the main spring resistance E through the groups of laminated spring plates F. As the friction shoes C approach each other laterally during the differential action referred to, the spring plates F will be flexed, thereby forcing the spring follower D inwardly at a greater rate than the friction shoes C.

Due to the differential action provided, and the consequent increased inward movement of the spring follower D, the main spring resistance E will be compressed to a considerably greater extent than the amount of inward movement of the main follower and wedge block B, thus increasing the capacity of the shock absorbing mechanism. The compression stroke of the mechanism will continue either until the actuating force is reduced or inward movement of the follower 15 is arrested by engagement with the front end of the casing A.

During release, when the actuating force is reduced, the expansive action of the main spring resistance E will restore the spring follower D to its normal position and the spring resistance elements F will be forced outwardly in unison with the spring follower D, and in assuming their normal curved position will restore the friction shoes to the position shown in Figure 1, outward movement of the wedge block B being limited by the retainer bolt G.

While I have herein shown and described what I consider the preferred manner of carrying out my invention, the same is merely illustrative and I contemplate all changes and modifications which come within the scope of the claims appended hereto.

I claim:

1. In a friction shock absorbing mechanism, the combination with a casing provided with opposed, interior, inwardly converging friction surfaces; of friction shoes cooperating with the opposed friction surfaces; a pressure transmitting block having wedging engagement with the shoes and adapted to force said shoes inwardly of the shell along the converging friction surfaces thereof, thereby effecting lateral approach of the shoes toward each other; spring resistance means opposing inward movement of the shoes, said spring resistance including a transversely disposed, curved spring plate interposed between the shoes bearing at opposite ends on the shoes and adapted to be flexed upon relative lateral approach of the shoes; a spring follower spaced from said shoes and bearing on said spring plate; and a main spring resistance opposing inward movement of said spring follower.

2. In a friction shock absorbing mechanism, the combination with a casing having opposed, inwardly converging friction surfaces; of friction shoes cooperating with said opposed friction surfaces; a pressure transmitting wedge block engaging said shoes; a main spring resistance within the casing; a spring follower cooperating with said main spring resistance; and a group of nested, transversely disposed, curved spring plates interposed between said friction shoes and adapted to be flexed upon relative approach of said shoes, said group of spring plates bearing directly on the spring follower.

3. In a friction shock absorbing mechanism, the combination with a friction shell having opposed, interior, inwardly converging friction surfaces at the forward end; of friction shoes at opposite sides of the shell having sliding engagement with the friction surfaces of the shell; means movable toward the shell engaging the shoes for moving the same inwardly of the shell along said converging friction surfaces and forcing the shoes laterally toward each other; a leaf spring composed of a group of intercalated spring plates, said group being interposed between the shoes, each plate of said group extending from one shoe to the other across the shell, and the plates of said group being bowed rearwardly upon relative movement of the shoes toward each other; and spring resistance means within the shell compressible lengthwise of the shell, against which said leaf spring is projected during compression of the mechanism.

4. In a friction shock absorbing mechanism, the combination with a casing provided with opposed, interior, inwardly converging friction surfaces at the forward end; of friction shoes cooperating with said friction surfaces, said shoes being movable inwardly on said friction surfaces during a compression stroke; a main spring resistance extending lengthwise of the shell and being compressible in a lengthwise direction, said spring resistance being located inwardly of the shoes; a group of nested, curved spring plates extending across the outer end of said spring resistance and yieldingly opposing relative approach of said shoes, said group of spring plates including front and rear plates, said group of plates being bowed inwardly to an extent to project the central portion of said rear plate rearwardly beyond the inner ends of the shoes; and a spring follower bearing on said main spring resistance and on the rear plate of said group and held spaced from the inner end of said shoes by engagement with said rear plate.

5. In a friction shock absorbing mechanism, the combination with a friction member; of a main spring resistance extending lengthwise of said member and being compressible in a lengthwise direction; a laminated plate spring at the forward end of said main spring resistance and extending across the latter, said laminated plate spring being curved from one end to the other and upon compression from opposite ends being bowed rearwardly and projected toward said main spring to compress the latter; and means movable inwardly lengthwise of the mechanism and having sliding frictional engagement with said member for moving said laminated plate spring inwardly of the mechanism and at the same time compressing said laminated plate spring from opposite ends to bow the same to project it toward said main spring resistance and compress the latter.

6. In a friction shock absorbing mechanism, the combination with a friction shell having interior, inwardly converging, friction wedge surfaces; of friction shoes having sliding engagement with said surfaces; a longitudinally disposed main spring resistance within the shell; a spring follower bearing on the front end of said spring resistance; and a group of spring plates interposed between said shoes, said group including front, rear, and intermediate plates extending across the mechanism from one shoe to the other, the opposite ends of said plates bearing on the inner sides of the shoes respectively and the front plate having shouldered engagement at opposite ends with transverse abutment ledges on the shoes, said plates being bowed rearwardly, and said rear plate of the group bearing on the spring follower in all operative positions of the mechanism.

In witness that I claim the foregoing I have hereunto subscribed my name this 28th day of May, 1928.

JOHN F. O'CONNOR.